United States Patent [19]

Jorgensen et al.

[11] Patent Number: 4,835,217

[45] Date of Patent: May 30, 1989

[54] PRESSURE-SENSITIVE ADHESIVE HAVING BROAD USEFUL TEMPERATURE RANGE

[75] Inventors: Jens L. Jorgensen; Thomas E. Haskett; John T. Rueb, all of St. Paul, Minn.

[73] Assignee: Minnesota Mining and Manufacturing Company, St. Paul, Minn.

[21] Appl. No.: 67,642

[22] Filed: Jun. 26, 1987

Related U.S. Application Data

[62] Division of Ser. No. 788,638, Oct. 17, 1985, Pat. No. 4,699,842.

[51] Int. Cl.$^4$ .................. C08L 53/00; C08L 33/00
[52] U.S. Cl. ..................................... 525/93; 525/100; 525/106; 525/201; 525/212; 525/217
[58] Field of Search ............ 525/88, 93, 100, 229, 525/201, 217, 212

[56] References Cited

U.S. PATENT DOCUMENTS

| | | | |
|---|---|---|---|
| 3,770,708 | 11/1973 | Knoepfel et al. | 526/304 |
| 3,922,464 | 11/1975 | Silver et al. | 428/355 |
| 4,077,926 | 3/1978 | Sanderson et al. | 260/29.6 |
| 4,110,290 | 8/1978 | Mori et al. | 260/29.6 |
| 4,199,645 | 4/1980 | Schwarz | 428/339 |
| 4,294,936 | 10/1981 | Korpman | 525/93 |
| 4,335,171 | 6/1982 | Zenk | 428/40 |
| 4,386,128 | 5/1983 | Yoshikawa | 428/152 |
| 4,418,120 | 11/1983 | Kealy et al. | 428/343 |
| 4,453,585 | 6/1984 | Ruggeberg, Sr. et al. | 160/354 |
| 4,460,371 | 7/1984 | Abber | 128/640 |
| 4,470,222 | 9/1984 | Killingsworth | 49/419 |
| 4,514,465 | 4/1985 | Schoenberg | 428/339 |
| 4,629,663 | 12/1986 | Brown et al. | 524/156 |

FOREIGN PATENT DOCUMENTS

| | | | |
|---|---|---|---|
| 0077164 | 4/1983 | European Pat. Off. | |
| 0180434 | 5/1986 | European Pat. Off. | |
| 3122455 | 6/1981 | Fed. Rep. of Germany | |
| 2145290 | 2/1973 | France | |
| 2065670 | 7/1981 | United Kingdom | 525/229 |

*Primary Examiner*—John C. Bleutge
*Assistant Examiner*—Ralph H. Dean, Jr.
*Attorney, Agent, or Firm*—Donald M. Sell; Walter N. Kirn; David L. Weinstein

[57] ABSTRACT

Pressure-sensitive adhesive composition, sheet material coated therewith, and a kit for installing insulation around windows comprising the coated sheet material. The adhesive composition consists essentially of a first component consisting essentially of a tackified, emulsifiable adhesive and a second component consisting essentially of at least one terminally unsaturated vinyl monomer, at least one vinyl-unsaturated, homopolymerizable, emulsifier monomer, and, optionally a small amount of an external emulsifier. The adhesive provides high tack and excellent adhesion at both low temperatures and high temperatures, thus rendering it suitable for outdoor use in areas that encounter extremes of weather.

15 Claims, 1 Drawing Sheet

PRESSURE-SENSITIVE ADHESIVE HAVING BROAD USEFUL TEMPERATURE RANGE

This is a division of application Ser. No. 788,638, filed Oct. 17, 1985, now U.S. Pat. No. 4,699,842.

BACKGROUND OF THE INVENTION

This invention relates to pressure-sensitive adhesives and sheet material, including tapes and the like, coated therewith.

Three properties which are useful in characterizing the nature of pressure-sensitive adhesives are tack, peel strength, and shear strength. The first measures the adhesive's ability to adhere quickly, the second it ability to resist removal by peeling back on itself from a surface, and the third its ability to hold in position when shearing forces are exerted. Generally speaking, the first two are directly related to each other but are inversely related to the third, cf., e.g., Sanderson U.S. Pat. No. 4,077,926, Col. 1, lines 31–36. For example although a given adhesive may exhibit high tack and high peel strength, the shear strength may be unacceptable for the intended purpose. Conversely, while an adhesive may exhibit high shear strength, the tack and peel adhesion may be unacceptable for the intended purpose. These shortcomings are often exacerbated at extremes of high and low temperature.

Modern industry presents a number of situations where pressure-sensitive adhesive products having balanced properties (i.e., excellent tack, peel strength, and shear strength) would be highly desirable. Some examples of these situations include installation of coated abrasive on power tools at low temperatures, installation of adhesive-coated substrates, e.g. tapes, at low temperatures. In these same situations, it is often necessary to have high peel strength at high temperatures.

Over the past several years rising energy costs have prompted occupants of buildings to conserve energy by means of insulation. The installation of shrinkable film or shrinkable/stretchable film over windows by means of double-stick tape (tape bearing a layer of adhesive on both major surfaces thereof) adhered to the interior window frame and to the film is known to exert a constant force at the film-adhesive interface and provide a degree of insulation. Normally the film is located between the window pane and the interior of the structure. Under normal room temperature conditions, the adhesive has physical properties which allow it to maintain the bond. There are many reasons for installing insulating film on the exterior part of the window. Some users may not want tape on their interior walls or interior window frames, they may want ready access to their windows, or they may have ornate window sills or frames which would hinder installation of the film on the inside. If the film is installed outdoors, the adhesive will be subjected to high temperatures during summer months and low temperatures during winter months. Of particular concern is the fact that, at elevated temperatures, the peel strength and shear strength of conventional pressure sensitive adhesives is greatly reduced. At the same tmie the film is exerting shrink tensions as high as 510 psi causing the bond to fail and the film to pull away from the exterior window frame. At reduced temperatures conventional pressure-sensitive adhesives have greatly reduced tack properties, making it difficult to create an adhesive bond with the film or window frame.

Rubber based adhesives, which are normally used for installation of shrinkable film currently commercially available, exhibit poor weathering characteristics, loss of tack at low temperatures, e.g. 0° C., and loss of shear at high temperature, e.g. 65° C.

Thus, there is a need for pressure-sensitive adhesives which have balanced adhesive properties over a wide temperature range, good adhesion to plastic films which for the most part have low energy surfaces and which can be prepared easily and economically on conventional equipment.

SUMMARY OF THE INVENTION

In one aspect, this invention involves pressure-sensitive adhesives which are useful over a wide temperature range, e.g., about $-45°$ C. to about 65° C. The adhesives exhibit excellent adhesion to low energy surfaces, e.g., to the surfaces of films made of polyolefins, such as polyethylene. In accordance with this invention, there is provided normally tacky and pressure-sensitive adhesive composition comprising a blend of:

a. a first component consisting essentially of an emulsifiable, tacky pressure-sensitive adhesive, preferably selected from rubber based adhesives, e.g. the thermoplastic elastomers, silicone adhesives, polyvinyl acetate modified acrylic adhesives, and polyvinyl acetate adhesives, and b. a second component which is a copolymer formed from monomers consisting essentially of
   (i) from 95 to 99.8 parts by weight of at least one terminally unsaturated vinuyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and
   (ii) from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (i) plus (ii) being 100, and said second component preferably contains a small amount of an external emulsifier.

It is preferred that the amount of the second component be sufficient to provide the pressure-sensitive adhesive composition with higher tack at 0° C. than the first component would exhibit if it were alone. This adhesive provides excellent tack, peel strength, and shear strength at both low and high temperatures. Articles bearing this adhesive can be affixed to various surfaces at low temperatures, e.g. about 0° C., and will remain adhered thereto at temperatures as high as about 65° C. By selecting appropriate adhesives for the first component, the adhesive of this invention can be tailored to have the characteristics of repositionability, removability from both low and high energy surfaces, high peel adhesion with respect to low energy surfaces, and many other heretofore unavailable properties.

The adhesive can be used as an adhesive mass or it can be applied to one or both major surfaces of a backing to form a pressure-sensitive adhesive tape.

In another aspect, this invention involves a kit for providing insulation comprising the pressure-sensitive adhesive tape of this invention and film of the type used to insulate windows, e.g. stretchable film, shrinkable film, or stretchable/shrinkable film. Because the adhesive can be formulated to allow repositioning of the tape and the film, the kit is particularly well-adapted for use by relatively unskilled installers. Moreover, the temperature characteristics of the adhesive tape render it suitable for outdoor use.

DETAILED DESCRIPTION

Adhesive suitable for the first component are emulsifiable, tacky pressure-sensitive adhesives. As used herein, the term "tacky" means having sticky nature or immediate adhesion on contact with a substrate. Some adhesives are inherently tacky while others are rendered tacky by addition of a tackifier. The term "tacky" is intended to refer to both inherently tacky adhesives and adhesive compositions which include an added tackifier. The term "emulsifiable" means capable of being converted into an intimate mixture of two incompletely miscible liquids in which one of the liquids in the form of fine droplets is dispersed in the other.

Although any emulsifiable, tacky pressure-sensitive adhesive can be used, adhesives derived from rubbers, silicones, polyvinyl acetate modified acrylics, and polyvinyl acetates are preferred for adhesive compositions that are expected to be removeable from various substrates. Examples of rubber based adhesives suitable for the first component include thermoplastic elastomers, such as, for example styrene-butadiene-styrene, styrene-isoprene-styrene, and styrene-ethylene/butylene-styrene. Examples of silicone based adhesives suitable for the first component include silicone elastomers or gums. The silicone elastomers of gums are typically provided as solvent solutions of elastomer or gum and MQ resin, such as, for example, that described in U.S. Pat. No. 4,460,371, incorporated herein buy reference, especially col. 5, line 47 through col. 7, line 26, thereof. An example of a polyvinyl acetate modified acrylic based adhesive suitable for the first component includes a composition containing 56% by weight isooctyl acrylate, 40% by weight polyvinyl acetate, and 4% by weight arylic acid dissolved in ethyl acetate. Representative examples of commercially available adhesives suitable for the first component include the styrene-isoprene-styrene elastomer "Kraton 1107" and the styrene-ethylene/butylene-sytrene elastomer "Kraton 1657", both available from Shell Chemical Company, and silicone elastomers such as "Silgrip PSA 595", "Silgrip PSA 596", and "Slipgrip PSA 6574", all available from General Electric Co.

The adhesives of the first component can be tackified by a tackifying agent, by appropriate modification of the structure of the adhesive molecule, or by a combination of both approaches. Tackifiers suitable for tackifying the pressure-sensitive adhesive of the first component include low molecular weight hydrocarbon resins, and α- and β-pinene based resins. Many tackifiers are commercially available, and optimum selection thereof can be accomplished by one of ordinary skill in the adhesive compounding art. Representative examples of commerically available tackifiers include the resins available under the trademarks "Regalrez 1018" and "Regalrex 1078", both available from Hercules Incorporated, "Exxon ECR 111", "Exxon ECR 327", and "Exxon ECR 328", all available from Exxon Corporation, and "Wingtack Plus", available from Firestone Tire and Rubber Co. The ratio of tackifier to adhesive in the first component preferably ranges from about 0.5:1.0 to about 1.5:1.0.

The second component of the adhesive of the present invention is preferably the copolymer described in Assignee's copending application No. U.S. Ser. No. 666,269, filed Oct. 29, 1984, now U.S. Pat. No. 4,629,663, incorporated herein by reference in total for the description of that copolymer. The copolymer is formed from monomers consisting essentially of:

(a) from 95 to 99.8 parts by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and (b) from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (a) plus (b) being 100, and said second component preferably contains a small amount of an external emulsifier.

The second component can be made with terminally unsaturated vinyl monomers as disclosed in Col. 3, line 28 through col. 4, line 2 of Silver, U.S. Pat. No. 3,922,464, incorporated herein by reference. Representative examples are listed below in Table A.

TABLE A

| Acrylate Monomers |
|---|
| isooctyl acrylate |
| isononyl acrylate |

| Modifying Comonomers |
|---|
| N—tert-octylacrylamide |
| N—tert-butylacrylamide |
| N—tert-amylacrylamide |
| N—isopropylacrylamide |
| isobutyl acrylate |
| ethyl acrylate |

N-tert-octylacrylamide has the formula $$CH_2=CHCONHC(CH_3)_2CH_2C(CH_3)_3.$$

The emulsifier monomer preferably comprises a monovalent salt of a styrene sulfonate. A monovalent salt of a styrene sulfonate reliably produces substantially coagulum-free latices, both the latices and polymers produced therefrom tend to have greater hydrolytic stability, and latices of higher solids can be obtained which are eaiser to coat. By substantially coagulum-free is meant a latex which neither hangs up on a stirrer nor prematurely plugs up a filter. A substantially coagulum-free latex can be obtained without external emulsifier, although at least 0.05 weight percent of external emulsifier would be preferred in commercial production to provide a margin of safety. Preferably the external emulsifier is noncationic and does not exceed 1.5 percent by weight of the second component.

Preferably from 0.5 to 2 weight percent of a monovalent salt of styrene sulfonate is used in making the copolymer of the second component in order to attain desirably high shear values. To employ above about 5 weight percent of a monovalent salt may make it difficult to maintain desirable peel adhesion values.

Latices of the second component can be made (1) by a single monomer-charge process, (2) by incremental or continuous monomer feed processes, and (3) by speed polymerization. A seed latex may have a composition different from that of the final latex. For example, the seed latex may omit the emulsifier monomer. Both persulfate and persulfate-redox initiator systems can be used.

Another class of copolymers that can be used as the second component in the present invention is that described in U.S. Pat. No. 3,922,464, incorporated herein by reference in total. The copolymer described therein is formed of monomers consisting essentially of a. from 88 to 99 parts by weight of at least one terminally unsaturated vinyl monomer, 70 to 100 weight percent of said vinyl monomer being selected from the class of non-tertiary alkyl acrylates wherein each aklyl group has at least half of its carbon atoms in a single chain and the average length of the alkyl chain is more than 4 and not more than 12, b. from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms and is nonionic and/or water-dispersible, and c. from 0 to 10 parts by weight of at least one zwitterion monomer having a free radically polymerizable unsaturated group, the total partss by weight of (b) plus (c) being at least 1 and not more than 12, and the total parts by weight of (a) plus (b) plus (c) being 100.

Suitable emulsifier monomers are set forth in column 4, line 12 through line 51 in U.S. Pat. No. 3,922,464. Suitable zwitterion monomers are set forth in column 4, line 63 through column 7, line 5 in U.S. Pat. No. 3,922,464. Suitable terminally unsaturated vinyl monomers are set fourth in column 3, line 34, through column 4, line 2 in U.S. Pat. No. 3,922,464.

This adhesive differs from the preferred adhesive of the second component in to aspects:

(1) 70 to 100 weight percent, rather than 60 to 100 weight percent, of the vinyl terminally unsaturated monomer must be selected from the designated class of non-tertiary akyl acrylates;

(2) at least one zwitterion monomer having a free radically polymerizable unsaturated group may be incorporated into the adhesive composition.

The preferred adhesive of the second component differs from the adhesive of U.S. Pat. No. 3,922,464 in that the emulisifer monomer comprises a monovalent salt of a styrene sulfonate. As compared to emulsifier monomers named in U.S. Pat. No. 3,922,464, a monovalent salt of a styrene sulfonate more reliably produces a substantially coagulum-free latices, both the latices and polymers produced therefrom tend to have greater hydrolytic stability, and latices of higher solids can be obtained which are easier to coat.

The adhesives in all but one of the examples in U.S. Pat. No. 3,922,464 require zwitterion monomer to provide good adhesion and cohesion.

A preferred method of preparing the adhesive of this invention is described below. A solution containing the emulsifiable, tacky adhesive which forms the first component of the adhesive composition of this invention is prepared by combining the following ingredients in the amounts indicated:

| Ingredient | Amount (parts by weight) |
| --- | --- |
| Adhesive | 100 |
| Solvent | sufficient to make a solution comprising from about 5 to about 60% solids |
| Tackifier (if required) | about 50 to about 150 |
| Antioxidant (if required) | up to about 1 |

It is strongly preferred that the solvent used to dissolve the adhesive of the first component have low polarity and low hydrogen bonding. As polarity of the solvent increases, it tends to mix with water utilized to prepare an aqueous emulsion and emulsion stability may be impaired. The solvent is preferably selected from toluene, xylene, VM+P naphtha, heptane, methylene chloride, or mixtures thereof.

The resulting solution is then converted into an emulsion by the addition of from about 10 to 70 parts by weight water and from about 0.25 to about 10 parts by weight surfactant. A portion of the water, preferably no more than about 25 percent by weight, can be replaced by alcohol, e.g., monohydric alcohol having 1 to 6 carbon atoms. It is necessary to convert the solution containing the adhesive into an emulsion so that it can be readily combined with the second component, which is typically provided in the form of an emulsion. Preferably, the solution is premixed with non-ionic surfactant, and the water is premixed with anionic surfactant before the solution is combined with the water to form the emulsion. For example, for each 100 parts by weight adhesive solution, about 0.55 part by weight non-ionic surfactant is typically added to the adhesive solution, and for each 20 parts by weight water, 0.28 part by weight anionic surfactant is typically added to the water.

It has been found that a small amount of anionic surfactant can be used to replace a larger amount non-inoic surfactant, the result being that the total amount of surfactant needed is reduced. Up to 50% by weight of non-ionic surfactant can be replaced by a lesser percentage by weight of anionic surfactant. For example, if one part by weight of non-ionic surfactant were normally required, 0.5 part by weight of non-ionic surfactant could be replaced by less than 0.5 part by weight of anionic surfactant. A non-ionic surfactant suitable for the present invention is designated by the trademark "Triton X-100", available from Rohm and Haas Co. An anionic surfactant suitable for the present invention is designated by the trademark "Triton X-200", available from Rohm and Haas Co. The amount of surfactant must not be so high that it will adversely affect the tack, peel strength, and shear strength of the ultimate adhesive. Surfactants to be added to the first component preferably have an HLB value of from about 10 to about 15.

It is preferred that the water used to form the emulsion be deionized, as deionized water provides greater emulsion stability.

It has also been found that when the particulate material contained in the emulsion is of relatively small size, e.g. having a mean diameter of from about 1 to about 35 micrometers, the resulting adhesive has better shear and peel characteristics. Determination of the size of particulate material in the emulsion can be accomplished by visual observation with the aid of a microscope.

The second component of the adhesive, can be prepared according to the procedure described in assignee's U.S. Ser. No. 666,269, filed Oct. 29, 1984, now U.S. Pat. No. 4,629,663, previously incorporated by reference. This second component is then preferably dissolved in sufficient water, preferably deionized water, to from an aqueous emulsion. The aqueous emulsion of the first component is then combined with the aqueous emulsion of the second component to form the adhesive of the present invention. The ratio of first component to second component in pressure-sensitive adhesives of this invention preferably ranges from about 5:1 to about 1:5, and more preferably ranges from 1:1 to 1:3. Ratios outside of these ranges can also be used to prepare useful pressure-sensitive adhesives; however, operating outside of the preferred range may reduce the breadth of the temperature range over which the adhesives will be useful.

Adhesive compositions according to the present invention preferably include an anti-oxidant to inhibit oxidation of the tackifying agent and consequent loss of tackiness as the adhesive composition ages. In this regard, it has been found important to use an anti-oxidant which is based on either (1) a hindered phenol or (2) a sulfur-containing organo-metal salt. Among the hindered phenols are the ortho-substituted or 2,5-di-substituent group is a branched hydrocarbon radical having 2–30 carbon atoms, e.g., tertiary butyl or tertiary amyl. Other hindered phenols useful in practicing the invention include para-substituted phenols where the substituent groups is -OR, R being methyl, ethyl, 3-substituted propionic ester, etc. Among the sulfur-containing organo-metal salts are the nickel derivatives of dibutyl dithiocarbamate.

Inorganic fillers such as calcium carbonate, clay, talc, silica, and limited amounts of carbon black can be used with the adhesives of this invention, as well as organic fillers such as wood flour or starch. Calcium carbonates, clays and talcs are most commonly used.

Various levels of fillers can be used to significantly reduce costs of formulations containing the adehsives of this invention. Lower levels will scarcelyy affect properties, whereas higher levels will appreciably increase stiffness, hardness, and resistance to deformation. Very fine particle size fillers, such as bentonite clay or a fumed silica sold under the trade designation "Cab-O-Sil" (Cabot Corporation), can be used to increase viscosity of solutions or to impart thixotropic solution properties.

The adhesives of this invention can be easily colored by compounding with dry pigments or color concentrates (usually polystyrene based). Because the base polymers are virtually clear and colorless, lower levels of pigments are required than with many other rubbers. Some typical pigments which may be usd are titanium dioxide and carbon black.

The adhesives of this invention require little or no added stabilizers for many applications. Thus, in most formulations, ingredients other than the adhesive of the first component and copolymer of the second component will degrade first. Therefore, the kind or type of stabilization required is highly dependent on the formulation rather than on the nature of the adhesive of the first component or copolymer of the second component.

Various stabilizer systems, as well as fungicides and mildewcides, are entirely compatible with the adhesives of this invention.

The resistance to ultraviolet light degradation of the adhesives of this invention can be enhanced by incorporating ultraviolet inhibitors into the adhesive composition of the invention. Typically a 1 phr loading of the ultraviolet inhibitor "Cyasorb IV 531" (American Cyanamid Co.), or a mixture of equal parts of ultraviolet inhibitors "Tinuvin 327" (Ciba-Geigy Corp.) and "Cyasorb UV 2300" (American Cyanamid Co.) is sufficient to provide this enhancement. Enhanced results may be achieved from a combination of 0.5 phr or one of the three just mentioned untraviolet inhibitors with one of the following nickel chelates: 0.5 phr "Cyasorb UV 1084" (American Cyanamid Co.) or 0.1 phr "NBC" (E. I. Du Pont de Nemours). As used herein, phr is based on the weight of the first component.

In order to form a pressure-sensitive adhesive tape with the adhesive of this invention, the adhesive need merely be applied to a suitable backing in a conventional manner, e.g. by knife coating or Mayer bar coating, and heating the coated backing to about 85° C. to 95° C. to remove excess moisture. For many purposes, it is preferred that the adhesive be coated on both sides of a tape backing, so that the tape can be adhered to two substrates. It is also preferred that the backing be made of transparent, flexible material.

The backing to which the coating of pressure-sensitive adhesive is applied may be cellophane or cellulose acetate. Other films, for example, films of ethyl cellulose, plasticized vinyl acetate-vinyl chloride copolymers, terephthalic acid-ethylene glycol polyester resins, and the like, are also effective as backings for use in connection with these adhesives. Backings made of non-woven materials may also be used. Where the adhesive is also transparent, a transparent pressure-sensitive adhesive tape is produced.

The backing may be given a preliminary adhesive priming coat if desired, although the adhesive herein described is ordinarily found to become firmly adherently bonded to most backings even in the absence of such priming layer. Colored films may be substituted, and colors or pigments, or contrasting opacifiers, may be incorporated in the adhesive, where colored tape products are desired.

Fibrous backings may also be employed, including treated or untreated paper, cloth, wadding, and the like. Tape products which are designated primarily for package sealing will ordinarily comprise cellophone or some equivalent thin, flexible and strong sheet material. However, it has been found that such coated sheets or strips have advantages in connection with adhesive bonding to many surfaces other than kraft paper, and hence no limitation is to be implied with respect either to the type of backing employed or to the type of surface to which the coated product is to be adhered.

The pressure-sensitive adhesive coated tapes of this invention have been found to possess an unusually desirable combination of bonding properties with regard to metal and wood surfaces. It has been found, for example, that such a pressure-sensitive adhesive tape adheres readily and firmly to clean surfaces of wood, aluminum sheet, and the like, when pressed thereagainst at low or high temperatures. The tape may then be removed by cautious stripping, and replaced, as many times as desired. With some of these adhesive compositions, adhesion to the surface is found to increase substantially when the tape is allowed to remain adherently attached to such surfaces for even a few hours. Under these conditions, many types of adhesive-coated backings are found to be permanently bonded to the surface so that they cannot be effectively removed. The same effect is obtained on other metallic surfaces and on painted or enameled surfaces.

Adhesive surfaces, and particularly those which tend to form a permanent bond with another surface on prolonged contact therewith, may be protected and preserved by means of suitable low-adhesion liners or coverings, of which polyethylene or other high molecular weight waxy type materials are exemplary, either in film from or as a surface coating on paper or other supporting web. Other suitable coating materials which serve as effective low-adhesion backsizes or coatings are described in U.S. Pat. Nos. 2,532,011 and 2,607,711.

when a tape surface bearing the adhesive of this invention is observed by means of a microscope at 3X, it can be seen that the surface is characterized by discrete regions of the component that is present in lower concentration dispersed within larger regions of the component that is present in higher concentration. In other words, the layer of adhesive does not exhibit a homogeneous surface.

If the first component of the adhesive were used alone, and if thermoplastic elastomers or silicones were employed as the adhesive, adhesion between the tape and insulating film would be unsatisfactory at high temperatures, e.g. at about 65° C. If polyvinyl acetate adhesive were used instead of thermoplastic elastomers or silicones, the adhesion between the tape and the insulating film would be unsatisfactory throughout the entire temperature range. If the second component of the adhesive were used alone, adhesion between the tape and insulating films made of polyethylene would not be satisfactory throughout the entire temperature range. The combination of the first component and second component provides both adhesion stability at high temperatures and initial adhesion (tack) at low temperature.

The adhesive tape of this invention exhibits several advantages over the prior art:
(1) It exhibits adhesion over a wide temperature range, namely −45° C. to 65° C. Accordingly, it can be used for adhering films thereto at relatively low temperatures and the film resists detachment from the adhesive at relatively high temperatures.
(2) It exhibits tack at relatively low temperatures, e.g. 0° C. Thus it can be adhered to various substrates under conditions which formerly rendered adhesion difficult, if not impossible.
(3) It allows repositioning of poymeric films applied thereto: it allows repositioning of itself on substrates to which it is applied.
(4) Even though it is capable of forming strongly adhering bonds, it can be cleanly removed from most substrates after it has been in place for periods of time of up to a year.
(5) It is capable of being adhered to a variety of substrates, e.g., painted wood, metal, vinyl.
(6) It is capable of being adhered to a variety of low energy substrates, e.g., polyolefin film, such as, for example, polyethylene.
(7) It has excellent resistance to degradation from ultraviolet radiation.

The following examples, which are illustrative rather than limiting or delineative of the scope of the invention, serve to describe the novel adhesives, their method of preparation, their properties, and their uses.

EXAMPLES

In each of the following examples, the same procedure was used to prepare the pressure-sensitive adhesive tapes. All amounts are in parts by weight unless otherwise indicated. This procedure was as follows:

PREPARATION OF FIRST COMPONENT

The adhesive and the tackifier in the amounts indicated were dissolved in toluene. In Examples 1, 3, and 4, the total amount of "Triton X-100" surfactant was added to the adhesive/tackifier/toluene solution. Then deionized water containing no surfactant was added to the adhesive/tackifier/toluene solution, and an emulsion was prepared by means of high speed mixing. In Example 2, the total amount of "Triton X-100" surfactant and one-half of "Triton X-200" surfactant were added to the asdhesive/tackifier/toluene solution. Then deionized water containing the remaining one-half of the "Triton X-200" surfactant was added to the adhesive/tackifier/toluene solution, and an emulsion was prepared by means of high speed mixing.

PREPARATION OF SECOND COMPONENT

To a vessel fitted with a variable speed agitator, condenser, purging tube for introducing nitrogen, and a recording controller were added the following materials while purging the flask with nitrogen:

| Ingredient | Amount (parts by weight) |
|---|---|
| Deionized water | 1477.0 |
| Sodium bicarbonate | 2.19 |
| Sodium dodecyl benzene sulfonate | 5.5 |
| Sodium styrene sulfonate | 18.3 |
| Isooctyl acrylate | 1591.0 |
| N—tert-octylacrylamide | 219.5 |

The solid N-tert-octylacrylamide was dissolved in the isooctyl acrylate before adding to the vessel. The nitrogen purge was continued until the end of the run. The vessel and its contents were heated to 50° C., at which temperature a first initiator charge of 4.57 parts of a 5% aqueous solution of potassium persulfate were added.

A change in color of the emulsion indicated the start of polymerization. The temperature was held near 50° C. by cooling and heating during the remaining period of reaction. 9.16 Parts of a 5% solution of potassium persulfate was added 6 hours and 45 minutes after the first potassium persulfate charge. After 3 hours and 20 minutes, 1.85 parts of a 5% aqueous solution of sodium meta-bisulfite were added. Nine identical additional charges of a 5% aqueous solution of sodium meta-bisulfite were added at intervals of about 45 minutes to complete the reaction, and the final batch was held for one hour after the additions before cooling.

PREPARATION OF ADHESIVE COMPOSITION

The emulsion containing the first component was then combined with emulsion containing the second component. In order to form the pressure-sensitive adhesive tapes of this invention, the combined emulsions were coated on a polyester backing, and the water and toluene removed by heating at 85° C. to 95° C. for 10 minutes.

The ingredients and amounts thereof used to prepared examples of adhesive compositions within the scope of this invention and comparative examples are set forth in Table I.

clamped in the lower jaws. The jaws are then separated at a rate of 35.7 cm/minute, the force to effect separation being reported in g/cm width.

Shear Adhesion (Holding Power). As used herein, this test is a modification of PSTC-7, described in the same publication referred to in the peel adhesion tests. A 1.27 cm×15.25 cm specimen of the adhesive described in the preceding two tests is mounted on a 7.5

TABLE I[1]

| Ingredient | A (Comp.) | B (Comp.) | C (Comp.) | D (Comp.) | 1 | 2 | 3 | 4 |
|---|---|---|---|---|---|---|---|---|
| First Component Rubber based adhesive Kraton 1657 | 18.80 | 17.60 | 18.90 | | 9.70 | 5.00 | 10.20 | 9.00 |
| Tackifier | | | | | | | | |
| Exxon ECR 111 | | 26.40 | | | | | 15.40 | |
| Exxon ECR 327 | | | 9.60 | | | | | 4.60 |
| Exxon ECR 328 | | | 18.90 | | | | | 9.00 |
| Regalrez 1078 | 18.80 | | | | 9.70 | 5.00 | | |
| Regalrez 1018 | 1.90 | | | | 1.00 | 1.50 | | |
| Surfactant | | | | | | | | |
| Triton X-100 | | | | | 0.50 | 0.16 | 1.10 | 0.50 |
| Triton X-200 | | | | | | 0.30 | | |
| Solvent | | | | | | | | |
| Toluene | 59.70 | 55.40 | 52.00 | | 30.72 | 17.80 | 43.60 | 25.00 |
| Antioxidant | | | | | | | | |
| Irganox 1076 | 0.40 | 0.30 | 0.30 | | 0.14 | 0.12 | 0.20 | 0.15 |
| Cyanox LTPD | 0.40 | 0.30 | 0.30 | | 0.14 | 0.12 | 0.20 | 0.15 |
| Water | | | | | 10.30 | 5.90 | 17.30 | 9.60 |
| Second Component[2] | | | | 100 | 37.80 | 64.10 | 12.00 | 42.00 |

[1]All amounts are in parts by weight.
[2]The second component is a terpolymer formed from isooctyl acrylate, octylacrylamide, and sodium styrene sulfonate.

TEST PROCEDURES

A number of industry-recognized tests are commonly employed to characterize the preformance of normally tacky and pressure-sensitive adhesive tapes. A brief summary of the tests employed to evaluate adhesives herein is described below:

Qualitative Tack 32° F. (0° C.): The qualitative "touch test" ratings are subjective tack ratings made by a 4-6 member tack panel. A 1.27 cm by 15.24 cm polyethylene film is used to test the tack of the adhesive at 0° C. The film is applied to the adhesive wiht a consistent pressure. Then the film is pulled off the adhesive at a 180° angle at a constant rate. The adhesive is rated on a 1-4 scale, 1 being on tack, 2 being low tack, 3 being good tack, and 4 being excellent tack.

Peel Adhesion: The test is a modification of PSTC-1, described in "Test Methods of Pressure-Sensitive Tapes", 7th Edition, Pressure-Sensitive Tape Council, Glenview, Ill., 1976. A solution of the adhesive to be tested is coated on a release liner in a quantity such that, upon evaporatoin of the solvent, the weight of adhesive remaining is approximately 0.91 grams per 10.56 cm×15.24 cm. Strips 15 cm long and 2.54 cm wide are cut from the tape and placed in contact with the substrate to which adhesion is to be determined. Substrates to be used are glass, polyethylene film, and latex painted wood. The glass is to be cleaned after each adhesive is tested using one wash of diacetone alcohol (technical grade) and three washes of heptane (analytical grade). The painted wood and the film are to be used only once. The liner is removed and using two passes of a 1.82 kg roller, the adhesive surface of the tape is forced into contact with the substrate. One end of the tape is doubled back on itself at 180°, the exposed portion of the substrate being clamped in the upper jaws of a tensile testing machine while the double-back end of the tape is cm×7.5 cm brushed stainless steel panel. The panel is then positioned with its long dimension at 2° from vertical so that the back of the panel forms an angle of 178° with the extended piece of tape, the 1.27 cm dimension of the adhesive extending in the vertical direction. The assembly is then placed in a 23° C. oven (50% relative humidity) and a 500 g weight attached to the free end of the tape. The cohesive strength of the adhesive is less than its adhesion to the brushed steel panel and the time required for the adhesive to fail cohesively, as evidenced by the tape falling free, is recorded as the shear in minutes.

Ultraviolet Stability (QUV) This procedure tests the stability of both the adhesive and film adhered tape coated with the adhesive under accelerated weathering conditions.

The double-coated adhesive tape is adhered onto a panel and one-half of the tape is covered with a piece of polyethylene film. The test sample is visually observed every twenty-four hours for cracks, yellowing, or degradation of the adhesive. The time to failure is reported in hours.

Stretched Film Test 140° F. (60° C.) The exposed side of the test tape is placed adhesive side down onto the outer edge of the latex painted window frame. The adhesive is pressed in place with even pressure. The liner is then removed and the film applied by stretching the film tautly across the window. The window with the film attached is placed into an oven at 49° C. for 24 hours. The test article is observed for failure to either the film or the wood. Observations are made at 2 hours intervals. If the adhesive does not fail at 49° C., the temperature is raised to 54° C. and observed for an additional 24 hours. If no failure is present, the temperature is increased to 60° C. The test article is then observed for failure or until 72 hours have passed. The time to failure is reported in hours and the type of failure observed is noted.

The results of the above-mentioned tests are set forth in Table II.

TABLE II

| Example | Tack (0° C.) | Adhesion to various substrates, g/cm[1] | | | QUV, hours to failure[2] | Shear, minutes to failure | Stretched film test (60° C.), hours to failure[3] |
|---|---|---|---|---|---|---|---|
| | | G | PW | PE | | | |
| A (Comp) | 1 | 580 | 312 | 357 | 100 | 10,000+ | 1 |
| B (Comp) | 1 | 982 | 469 | 670 | 165 | 10,000+ | 1 |
| C (Comp) | 1 | 692 | 179 | 357 | 72 | 8,178 | 1 |
| D (Comp) | 4 | 379 | 268 | 156 | 200+ | 10,000+ | 12 |
| 1 | 4 | 603 | 380 | 335 | 200+ | 198 | 48+ |
| 2 | 4 | 513 | 402 | 223 | 200+ | 4,200+ | 48+ |
| 3 | 4 | 558 | 290 | 491 | 158 | 577 | 24+ |
| 4 | 3 | 513 | 346 | 446 | 178 | 290 | 36 |

[1] G represents glass; PW represents printed wood; PE represents polyethylene
[2] QUV is a measure of accelerated weathering. It was measured on an accelerated weathering tester manufactured by Q Panel Co. under the following conditions: exposure to ultraviolet light for 4 hours followed by exposure to the following humidity conditions for 4 hours (40° C. 100% relative humidity)
[3] Polyethylene film (RD 102, manufactured by W. R. Grace & Co.) was applied to a strip of tape. The composite was subjected to 140 F. until the bond was split. The time of failure was recorded.

Comparative examples A, B, C and D are formulations of prior art adhesives that can be combined to make up the adhesive composition of the present invention. Formulations A, B, and C are compositions comprising rubber based adhesives and different tackifiers. Each of these adhesive formulations is characterized by having good peel adhesion to various substrates at room temperature (25° C.) and having shear of 8000 minutes or greater. All of the rubber based adhesives are characterized by having low tack at 0° C. and having poor adhesion at 65° C. Each of these adhesives failed the stretched film test after only 1 hour at 65° C.

THe terpolymer used in formulation D has excellent low temperature tack. At 65° C. polymeric film loses adhesion to the adhesive of formulation D after only 12 hours. The adhesion of formulation D to various surfaces is much lower than that of formulations A, B, or C but is adequate for reasonable performance.

Examples 1, 2, 3 and 4 are adhesive compositions of this invention. Example 2 is the preferred composition. Each of these adhesive compositions perform adequately through a temperature range of −40° C. to 68° C. The shear in minutes is not as high as that of the compositions of comparative examples A, B, C, or D but is adequate to meet performance requirements. The tack at 0° C. is excellent. This indicates that polymeric film can be applied to a tape bearing the adhesive composition of this invention at a low temperature. Tapes using the adhesive compositions of Example 1 and 2 did not fail the stretched film test even after 48 hours. Adhesive compositions of Examples 3 and 4 failed the stretched film test before 48 hours were reached.

EXAMPLE 5

Figure 1:
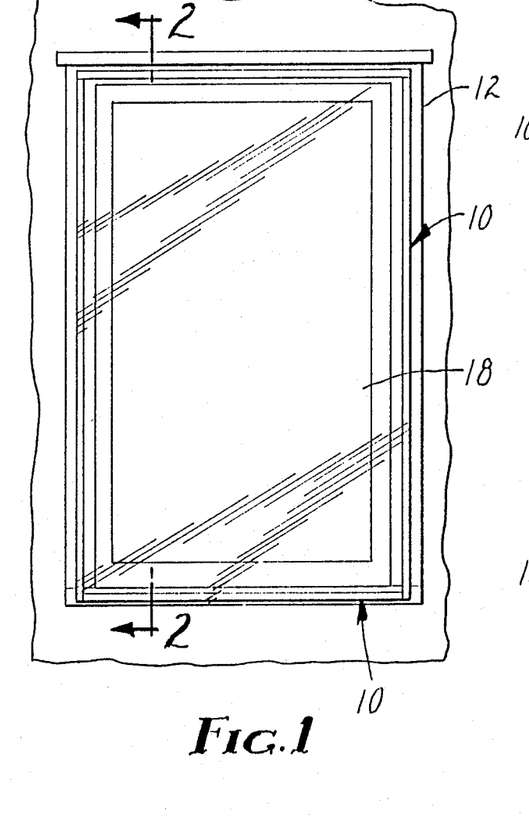
FIG. 1 is a plan view of a window and window frame wherein a plastic film is adhered to the exterior of said window frame by means of double-stick tape bearing the adhesive of this invention.
Figure 2:
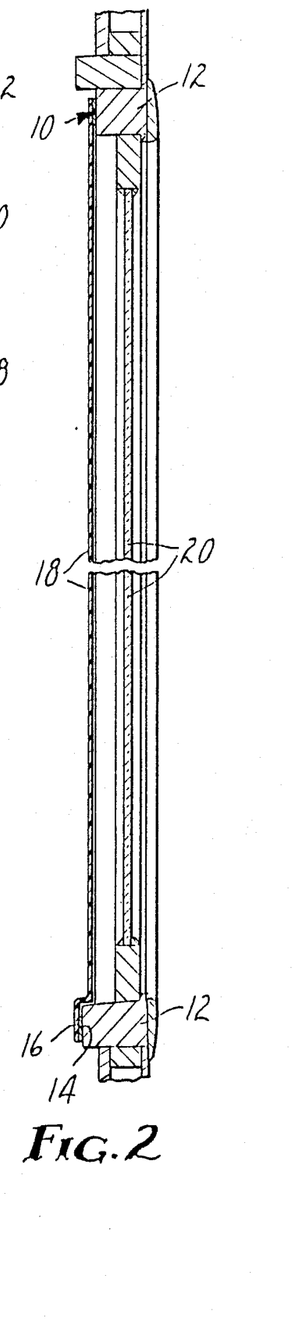
FIG. 2 is a sectional view of the window and window frame of FIG. 1 taken along line 2—2.

FIGS. 1 and 2 illustrate one of the many uses of the present invention, namely, to affix a sheet of polymeric film to a window frame to provide a means of insulation. The tape of this invention is preferably provided in a roll. Each major surface of the tape bears a layer of the adhesive described in Example 2, supra. Thus, the tape is designated a double-stick tape. It is preferable that the surface of the tape that is to contact the window frame exhibit a peel adhesion value sufficiently high that the tape will not detach from the frame when the insulating film is being repositioned. However, it is preferable that the surface of the tape that is to contact the insulating film exhibit a peel adhesion value sufficiently low that the insulating film can be repositioned before final mounting. If the same adhesive composition is used on both major surfaces of the tape, it is preferred that the quantity of adhesive on the surface to contact the polymeric film be less than the quantity of adhesive on the surface to contact the window frame so that the polymeric film can be easily repositioned without detaching the tape from the window frame. In this particular case, the surface of the tape intended to contact the window frame has an adhesive coating density of 0.91 grains/10.16 cm×15.24 cm, and the surface of the tape intended to contact the insulating film had an adhesive coating density of 0.46 grains/10.16 cm×15.24 cm. Differential adhesion values can be attained by other means, e.g. by using a different adhesive composition on each surface of the tape. The adhesive on the surface that is to contact the film is preferably covered with a protective release liner for the reasons previously stated. Preferred materials for the polymeric film are polyester, e.g. polyethylene terephthalate, polyolefin, e.g., of the film preferably ranges from 0.015 to 0.070 mm. The preferred film is a 0.02 mm radiation-crosslinked polyethylene. The film can be transparent or tinted to reduce sunlight and glare. It is also preferred that the film be shrinkable, by heat, or stretchable, by tension so that wrinkles in the film can be removed after installation. If the film is shrinkable, it is preferred that the shrinkage be between 1 and 10% in both directions at 70° C. as measured in accordacne with ASTM-D-2732 (1976). If the film is stretchable, it is preferred that the film have a bulk modulus of between 8000 and 120,000 psi and an elongation of 75 to 600% as measured in accordance with ASTM-D-882 (1981). Furthermore, it is preferred that the film be capable of withstanding temperatures of from about −50° C. to about 65° C. and have a transparency grater than 85% as measured in accordance with ASTM-D-1003 (1977). A representative example of a film suitable for window insulation purposes is available from W. R. Grace & Co. and has the trade designation "RD-102". This film is a heat shrinkable and/or stretchable rediation crosslinked bi-axially oriented blown polyethylene film.

The tape 10 is unwound from the roll and is affixed to window frame 12 by means of adhesive surface 14 thereof. The release liner (not shown) is removed from adehsive surface 16 of tape 10, thus exposing the adhesive for attachment to polymeric film 18. A thin, preferably transparent, polymeric film 18 can then be affixed to window frame 12 with the available surface 16 of double-stick tape 10 so that there is gap between film 18 and window pane 20.

Within the first few minutes after application, the film can be removed and repositioned without adhesive transfer or film distortion. Within an hour, however, adhesion has increased significantly. The film can be trimmed, as with scissors or razor blade, so that excess film material will not extend beyond the edge of the double-stick tape.

For standard sized windows, prefabricated film with double-stick tape adhered thereto can be used. The tape would have a protective release liner on the surface of the tape to prevent the tape from adhering to itself prior to use. The protective release liner would be removed before the polymeric film is installed on the window frame. Wrinkles in the film can be removed by subjecting the film to tension, if it is stretchable, or to heat, as with a heat-gun or hair dryer, if it is heat-shrinkable. While the initial adhesion is relatively low, it builds to a strong bond within a brief time.

Various modifications and alternations of this invention will become apparent to those skilled in the art without departing from the scope and spirit of this invention, and it should be understood that this invention is not to be unduly limited to the illustrative embodiments set forth herein.

What is claimed is:

1. An adhesive composition consisting essentially of
   (a) a first component consisting essentially of a water-emulsifiable, tacky adhesive selected from the group consisting of rubber-based adhesives, polyvinyl acetate modified acrylics, and polyvinyl acetates, and
   (b) a second component consisting essentially of a copolymer formed from
      (i) from 95 to 99.8 parts by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and
      (ii) from 0.2 to 5 parts by weight of at least one vinyl-unsaturated, homopolymerizable emulsifier monomer which is a surfactant having both a hydrophobic and hydrophilic moiety, contains at least 5 but not more than 40 carbon atoms, and is water dispersible,
   the total parts by weight of (i) and (ii) being 100.

2. The adhesive composition of claim 1 wherein said second component is present in an amount sufficient to provide said adhesive composition with higher tack at 0° C. than said first component would exhibit if it were alone.

3. The adhesive composition of claim 1 wherein said emulsifier monomer being a monovalent salt of a styrene sulfonate.

4. The composition of claim 1 further including an antioxidant.

5. The composition of claim 1 further including a material that enhances resistance to ultraviolet light.

6. The composition of claim 1 further including a tackifier.

7. The composition of claim 1 wherein the adhesive of said first component rubber based adhesive comprises a thermoplastic elastomer.

8. The composition of claim 7 wherein said thermoplastic elastomer is a block coploymer selected from the group consisting of styrene-butadiene-styrene, styrene-isoprene-styrene, and styrene-ethylene/butylene-styrene.

9. The composition of claim 1 wherein the adhesive of said first component comprises a silicone elastomer or a silicone gum.

10. The composition of claim 1 wherein the adhesive of said first component comprises polyvinly acetate.

11. The composition of claim 1 wherein the ratio of said first component to said second component ranges from about 5:1 to about 1:5.

12. The composition of claim 11 wherein the ratio of said first component to said second component ranges from about 1:1 to about 1:3.

13. Method of preparing the adhesive of claim 1 comprising the steps of:
   dissolving said frist component in a solvent;
   providing an aqueous emulsion of said dissolved first component;
   providing an aqueous emulsion of said second component;
   combining said aqueous emulsion of said dissolved first component and said aqueous emulsion of said second component;
   removing the water and solvent from said aqueous emulsion combination.

14. An adhesive composition consisting essentially of:
   (a) a first component consisting essentially of a water-emulsifiable, tacky adhesive selected from the group consisting of rubber-based adhesives, polyvinyl acetate modified acrylics, and polyvinyl acetates, and
   (b) a second component consisting essentially of copolymer formed from monomers consisting essentially of
      (i) from 88 to 99 parts by weight of at least one terminally unsaturated vinyl monomer, 70 to 100 weight percent of said vinyl monomer being selected from the class of non-tertiary alkyl acrylates wherein each alkyl group has at least half of its carbon atoms in a single chain and the average length of the alkyl chain is more than 4 and not more than 12,
      (ii) from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms and is nonionic and/or water-dispersible, and
      (iii) from 0 to 10 parts by weight of at least one zwitterion monomer having a free radically polymerizable unsaturated group.
   the total parts by weight of (ii) plus (iii) being at least 1 and not more than 12, and the total parts by weight of (i) plus (ii) plus (iii) being 100.

15. The composition of claim 14 wherein the adhesive of said first component rubber based adhesive comprises a silicone elastomer or a silicone gum.

* * * * *

UNITED STATES PATENT AND TRADEMARK OFFICE
CERTIFICATE OF CORRECTION

PATENT NO. : 4,835,217

DATED : May 30, 1989

INVENTOR(S) : Jorgensen et al.

It is certified that error appears in the above-identified patent and that said Letters Patent is hereby corrected as shown below:

In Column 1, Line 15, "it" should read --its--.

In Column 1, Line 62, "tmie" should read --time--.

In Column 2, Line 5, "temperature" should read --temperatures--.

In Column 3, Line 43, "buy" should read --by--.

In Column 3, Line 55, "Slipgrip" should read --Silgrip--.

In Column 5, Line 9, "speed" should read --seed--.

In Column 5, Line 45, "fourth" should read --forth--.

In Column 5, Line 48, "to" should read --two--.

In Column 7, Line 14, "from" should read --form--.

In Column 7, Line 35, "2-30" should read --3-20--.

UNITED STATES PATENT AND TRADEMARK OFFICE
CERTIFICATE OF CORRECTION

PATENT NO. : 4,835,217

DATED : May 30, 1989

INVENTOR(S) : Jorgensen et al.

It is certified that error appears in the above-identified patent and that said Letters Patent is hereby corrected as shown below:

In Column 7, Line 48, "adehsives" should read --adhesives--.

In Column 7, Line 49, "scarcelyy" should read --scarcely--.

In Column 7, Line 62, "usd" should read --used--.

In Column 9, Line 22, "when" should read --When--.

In Column 9, Line 45, "ture" should read --tures--.

In Column 9, Line 58, "thereto:" should read --thereto;--.

In Column 10, Line 24, "asdhesive" should read --adhesive--.

In Column 11, Line 6, "pared" should read --pare--.

In Column 11, Line 46, "on" should read --no--.

In Column 11, Line 53, "evaporatoin" should read --evaporation--.

UNITED STATES PATENT AND TRADEMARK OFFICE
CERTIFICATE OF CORRECTION

PATENT NO. : 4,835,217

DATED : May 30, 1989

INVENTOR(S) : Jorgensen et al.

It is certified that error appears in the above-identified patent and that said Letters Patent is hereby corrected as shown below:

In Column 13, Line 34, "THe" should read --The--.

In Column 14, Line 40, after "e.g.,", insert --polyethylene, polypropylene, and cellophane. The thickness--.

In Column 14, Line 48, "accordacne" should read --accordance--.

In Column 14, Line 55, "grater" should read --greater--.

In Column 14, Line 60, "rediation" should read --radiation--.

In Column 14, Line 65, "adehsive" should read --adhesive--.

UNITED STATES PATENT AND TRADEMARK OFFICE
CERTIFICATE OF CORRECTION

PATENT NO. : 4,835,217

DATED : May 30, 1989

INVENTOR(S) : Jorgensen et al.

It is certified that error appears in the above-identified patent and that said Letters Patent is hereby corrected as shown below:

In Column 16, Line 2, delete "rubber based adhesive".

In Column 16, Line 13, "polyvinly" should read --polyvinyl--.

In Column 16, Line 22, "frist" should read --first--.

Signed and Sealed this

Eighteenth Day of September, 1990

Attest:

HARRY F. MANBECK, JR.

Attesting Officer     Commissioner of Patents and Trademarks